Dec. 20, 1949　　　R. L. BROWNING　　　2,491,850
BRAKING MECHANISM

Filed Oct. 6, 1943　　　3 Sheets-Sheet 1

Richard L. Browning,
INVENTOR.

BY Saywell & Wesseler,
ATTORNEYS.

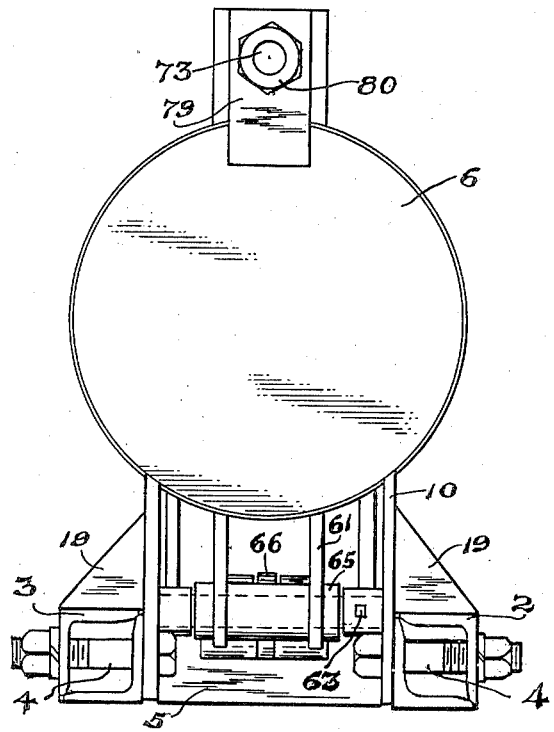
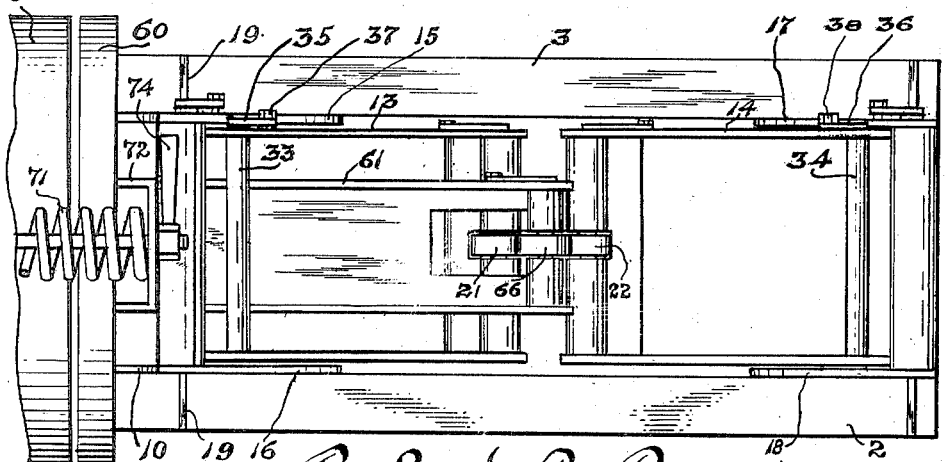

Dec. 20, 1949 R. L. BROWNING 2,491,850
BRAKING MECHANISM
Filed Oct. 6, 1943 3 Sheets-Sheet 3
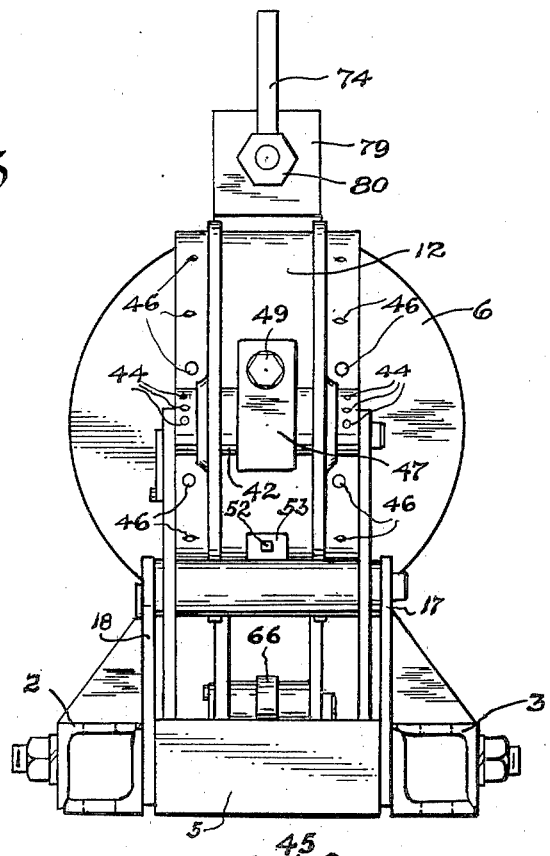
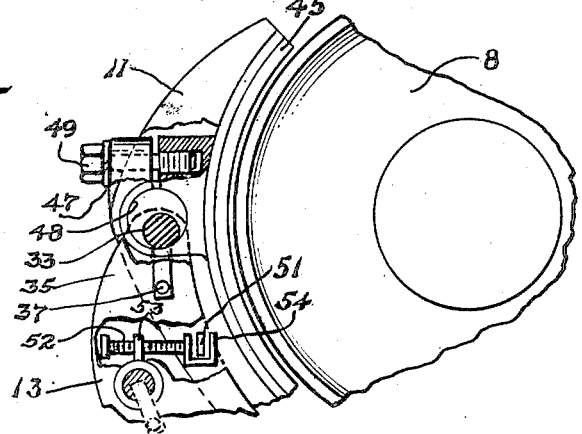
Richard L. Browning,
INVENTOR.
BY Saywell & Wesseler,
ATTORNEYS.

Patented Dec. 20, 1949

2,491,850

UNITED STATES PATENT OFFICE 2,491,850

BRAKING MECHANISM

Richard L. Browning, Euclid, Ohio, assignor to Victor R. Browning & Company, Incorporated, Willoughby, Ohio, a corporation of Ohio Application October 6, 1943, Serial No. 505,089

15 Claims. (Cl. 188—171)

This invention relates to a braking mechanism. In its preferred form it comprises a brake held inactive by means associated with the driving mechanism of the apparatus to which the brake is attached and rendered operative to retard or stop such apparatus upon the shutting down of the driving mechanism. The invention includes an automatic brake peculiarly adapted for use in connection with a hoist mechanism driven by an electric motor wherein a magnetic unit in circuit with the motor normally holds the brake inactive, but which serves to release the brake to operative position through spring action or the like when the motor switch is moved to stop the motor and de-energize the magnetic unit. The invention also includes the provision of a compact braking unit of skeletonized steel construction with a welded frame of great strength and relatively light weight and with the operative parts nested in closely spaced relation with small relative movement but high braking capacity of progressively increasing effectiveness. The invention also includes precision adjustment of the brake-shoe spacing and plane of operation, as well as the limit of free movement of the brake-shoes, and provides broad bearing surfaces for the pivot elements to insure long service life. The invention also includes an independently mounted operating and control unit readily replaceable on continuous service apparatus in the event of an emergency.

The principal object of the present invention is to simplify and improve the construction of braking mechanism for use on various types of apparatus, including cranes and hoisting apparatus.

Another object of the invention is to provide an improved braking mechanism consisting of few parts particularly adapted for easy assembly and installation, and readily accessible for inspection or replacement.

Another object of the invention is to provide a brake mechanism wherein a bodily removable operative unit, having an independent lever arm carrying a roller is positioned above a pair of rollers on the brake-shoe supporting levers and may be moved against said rollers to cause spreading action thereof and movement of said levers associated with said rollers with increasing force as the independent roller proceeds along its path of movement, and compensating for the reduction in the compression of the actuating spring.

Another object of the invention is to provide a pair of brake levers carrying brake-shoes on eccentric elements adapted for ready adjustment and supporting said brake-shoes on broad bearing elements, reducing the wear upon the associated parts.

Another object of the invention is to provide brake-shoe supporting members having pivotal support of broad area and carrying roller elements at their free ends against which a pressure applying roller is engaged under predetermined conditions of operation.

Another object of the invention is to provide a braking mechanism with parts formed as bellcrank levers having long leverage but compact over all dimensions.

Another object of the invention is to provide a braking mechanism providing great strength and light weight.

Another object of the invention is to provide a combined spring tensioning and emergency brake relieving element of simple structure and readily accessible in the event of an emergency.

Other and further objects of the present invention will appear in the course of the following description.

To the accomplishment of the foregoing and related ends, said invention consists of the means hereinafter fully described and particularly pointed out in the claims, the annexed drawing and the following description setting forth in detail certain structures and apparatus embodying the invention, such disclosed means constituting, however, but several of various forms in which the principle of the invention may be used.

In the drawings,

Fig. 2 is an end view of the mechanism shown in Figure 1 as seen from the left-hand side;

Fig. 3 is an end view of the mechanism shown in Figure 1 as seen from the right-hand side;

Fig. 4 is a fragmentary diagrammatic plan view of the mechanism with the brake-shoes and brake drum removed; and Fig. 5 is a fragmentary sectional view of the brake-shoe adjusting mechanism.

Figure 1:
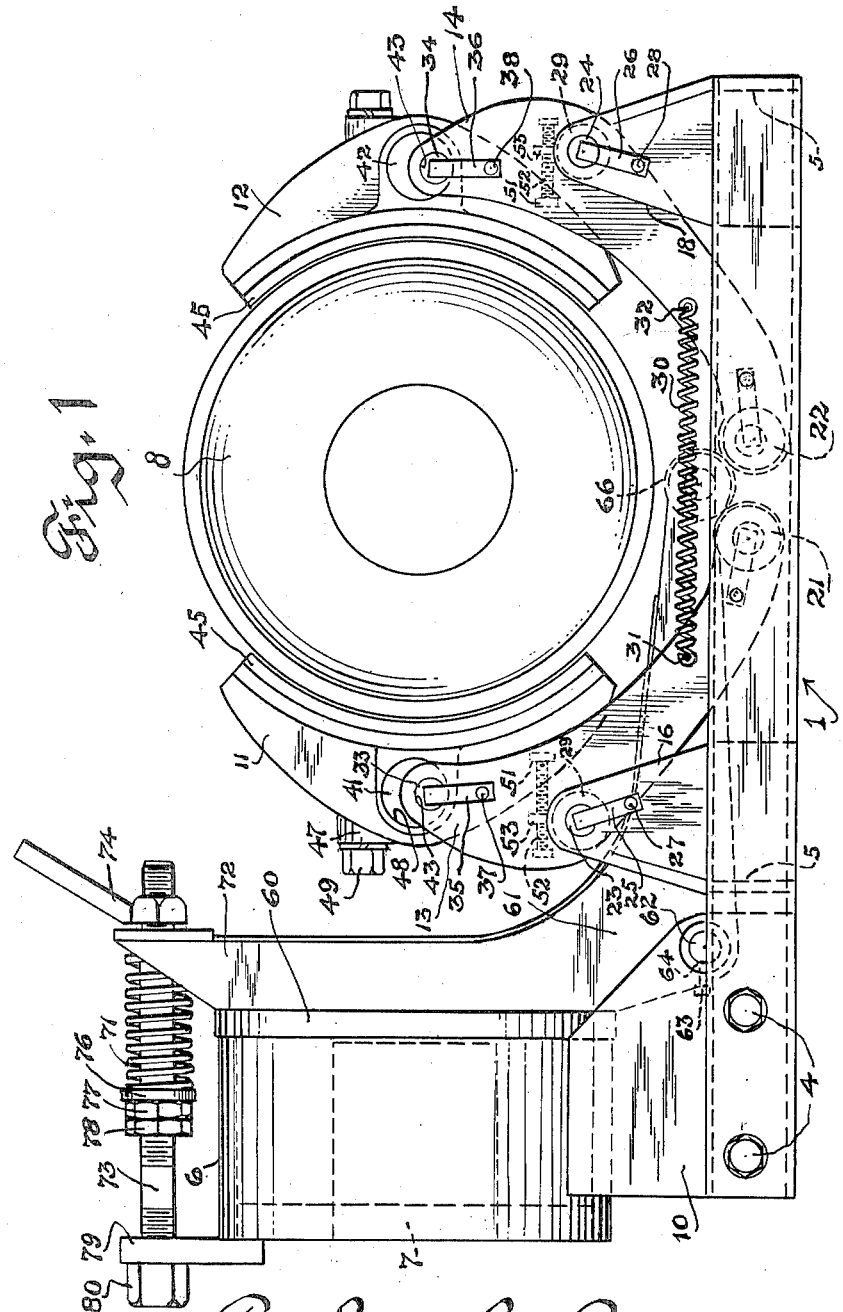
Fig. 1 is a side elevation of a braking mechanism embodying my invention.

As is clearly shown in the drawings the automatic braking mechanism may be embodied in a skeletonized structure 1 comprising side frames formed of pairs of angle bars welded to form rectangular side bars 2, 3, having a plurality of standards with spacing members 5. A removable frame section 10, bolted to the main frame by pairs of bolts 4, supports a magnet housing 6, with a magnet coil 7, which preferably is connected with the motor (not shown) with which is associated the brake drum 8. The units may be variously connected but preferably the motor is in series with the magnet and the magnet when energized releases the brake-shoes from the drum, as will be presently described.

The brake-shoes 11, 12, are carried on pivoted frame members 13, 14, of bell-crank shape supported between pairs of side plates or standards 15, 16, and 17, 18, respectively, welded at spaced points to the side frame bars 2, 3, and preferably having gusset plates 19. The free ends of the bell-crank frame members are turned toward each other and carry rollers 21, 22, respectively, in closely spaced relation centrally between the side bars 2, 3. The pivots 23, 24, for the respective bell-crank frames are adjacent the lower portions of their upright sections and comprise pivot pins engaged through apertures in the upper portions of the pairs of standards 15, 16, and 17, 18, respectively. The pivot pins have terminal bars 25, 26, on one end carrying locking bolts 27, 28, engageable in suitable apertures on the adjacent standards referred to, respectively. Suitable hardened bushings 29 are frictionally engaged in the bell-crank frames and are engaged over the hardened pins to reduce wear to a negligible amount. The angle sections of the bell-crank frames are connected to each other by a light spring 30, having its ends engaged over studs 31, 32, spaced inwardly a slight distance from the frame ends which carry the rollers 21, 22, at a central position. A similar spring may be used on each side for balanced action. At the upright ends of the bell-crank frame members 13, 14, pivot pins 33, 34, are provided having terminal bars 35, 36, respectively, with locking bolts 37, 38, respectively, engaging the frame members 13, 14. The pivot pins 33, 34, revolubly support cylindrical adjusting members 41, 42, respectively, each having an off-center or eccentric bore 43 and formed with a series of inwardly extending radial apertures 44 adjacent each end thereof. The brake-shoes are of conventional arcuate shape and have suitable friction lining 45 secured to the body of the shoe by suitable fastening means, such as rivets 46. Each brake-shoe is enlarged centrally to provide a boss 47, having a transverse aperture 48, of a size to receive the cylindrical adjusting member 41 or 42, above mentioned, for spacing it from the brake drum 8.

The transverse aperture 48 in each lug 47 may be in the form of a split socket, each lug 47 mounting a suitable bolt 49 to clamp firmly the adjacent eccentric adjusting member at the proper angle to space the brake-shoe a predetermined distance from the brake drum 8. The radial apertures 44 formed in each eccentric member 41, 42, provide for rotation thereof by means of a bar or similar instrument to a position of precise spacing of the adjacent brake-shoe from the surface of the brake drum. Adjacent the lower end of each of the brake-shoes an extension lug 51 is provided which bears against the end of an adjusting bolt 52, screw-threadedly engaged in an extension plate 53 on the central end portion of the bell-crank frame member, which limits the pivotal movement downwardly of the brake-shoe. The U-shaped plate terminal 54 is swivelled and is used to limit upward as well as downward movement and vibration. It will be noted that the lateral position of the brake-shoe on the drum as well as its spacing from the drum may be adjusted preliminary to tightening the clamping bolt 49. The means for moving the brake-shoes against the drum is provided by an independent removable frame unit, carrying an armature frame 61 carrying an armature 60. It is provided with a pivot pin 62 held by a set-screw 63 seated against a flattened area 64. The lower end of the armature frame 61 projects through an opening in the frame member 13, with its terminal roller 66 above the rollers 21, 22, as shown in Fig. 1. A hardened bushing 65 is frictionally engaged in the armature frame which, it will be noted, oscillates the slight distance necessary to apply or release braking pressure. At the extreme lower end of the armature frame the pressure roller 66 is carried at a central position immediately above the rollers 21, 22, which are mounted in closely spaced relation on the respective free ends of the bell-crank frame members 13, 14, carrying the brake-shoes. The rollers 66, and 21, 22, are all preferably ball-bearing units and are of substantial width. The roller 66 is preferably of approximately the diameter of the rollers 21, 22, and has a path of movement between the rollers 21, 22. Thus, while the independent bell-crank frame unit, in the preferred form of construction, is not positively connected with the brake-shoe operating frames, it has in effect a toggle action against such frames increasing in effectiveness progressively with the amount of its movement and the degree of separation of the rollers 21 and 22. The means for controlling the armature frame 61 may vary with the structure to which it is applied, but in the apparatus illustrated and adapted for use on cranes and hoisting apparatus, it is moved to braking position by a compression spring 71 when the disc 60 is released by the magnet 7.

The armature frame 61 is provided at a central position with an upright channel bar 72, the upper end of which is formed with a through opening for one end portion of a rod 73 formed of non-magnetic material and having a screw-threaded end section on which is mounted a nut 73a having a combined spring tension hand lever 74 and emergency brake release. A compression spring 71 abuts the bar 72 at one end and at its opposite end a non-magnetic washer 76 seated against a pair of spring abutment nuts 77, 78, engaged on the screw-threaded section of the rod 73. The outer end of the rod is screw-threadedly engaged in a terminal plate 79 on the armature housing 6, to which it is fastened by means of a terminal nut 80. The channel bar upright 72 is preferably welded to the armature disk 60.

The operation of the apparatus has been indicated in the description of the structural parts, but may be briefly summarized as relates to the form of construction illustrated as follows. When the switch is turned to energize the motor, the magnet 7 is also energized and the armature disk 60 is attracted thereto. As the compression spring is further compressed and the upright bar 72 of the armature frame moves toward the magnet the lower end of the armature frame carrying the roller 66 is moved away from the rollers 21, 22. The light tension spring 30 then turns the bell-crank frame members 13, 14, carrying the brake-shoes 11, 12, away from the brake drum 8, whereby the latter operates freely until the motor is shut down. When the current is cut off, the magnet will be de-energized and the compression spring 71 will force the armature frame away from the magnet, depressing the roller 66 and forcing the rollers 21 and 22 outwardly to operate the upper portions of the bell-crank frame members 13, 14, carrying the brake-shoes into pressure applying movement toward the brake drum. As will be observed, the braking pressure is increased in effectiveness with the degree of movement of the roller 66 against the rollers 21, 22. This also compensates for the reduction in pressure of the expansion spring in its movement toward a free-length position. The movement of the roller 66 is positive against the two rollers 21, 22, and if the associated mechanism of either roller 21 or 22 fails, the full pressure of the roller 66 will be applied to the other roller of the pair and full braking pressure thus applied through a single shoe. This differs from units which become inoperative when one unit of the pair fails.

The apparatus provides a structure of great strength and of relatively light weight. Through the use of bell-crank frame members 13, 14, with roller terminals and with the pressure applying frame nested within the brake-shoe carrying frames a very compact structure results without loss of leverage. The degree of movement of the parts, as well as the number of structural parts, is reduced to a minimum. This also facilitates the manufacture of the device and its assembly and maintenance. This is of particular importance in connection with the use of the apparatus on cranes and hoisting mechanism, where compactness and speedy dependable operation are essential.

While applicant has described one form of combination embodying the invention, it is not intended to restrict the invention to an electromagnetic braking mechanism in the broader aspects of some of the features described inasmuch as mechanical and fluid operated brakes may be used with such features to advantage.

Other modes of applying the principle of my invention may be employed instead of those explained, change being made as regards the structure and apparatus herein disclosed, provided the means stated by any of the following claims or the equivalent of such stated means be employed.

I therefore particularly point out and distinctly claim as my invention:

1. A braking mechanism having in combination a frame, a brake drum, a pair of oppositely positioned, inwardly turned bell-crank levers mounted on said frame and carrying brake shoes at their upper ends and rollers at their adjacent ends normally held in spaced non-braking relation, an independent bell-crank lever mounted on said frame having a roller at its lower end adjacent said last named rollers and having means for actuating said brake shoe levers by applying pressure on said last named rollers, all of said bell-crank levers being positioned adjacent the sides and lower portions of said brake drum, and means for applying braking pressure to said brake shoe levers through toggle type action of the roller of said independent lever, and separate means for relieving said braking pressure of said independent lever to permit the brake shoes to be withdrawn from the brake drum.

2. A brake mechanism having in combination a frame, a brake drum, a pair of bell-crank levers mounted on said frame each carrying a brake shoe at its upper end and a roller at its lower end, said lower ends being adjacent each other beneath the brake drum and being normally in brake released position, an independent bell-crank lever having a pressure roller terminal element at its free end in operative relation through toggle type action on the rollers at the lower ends of said brake shoe supporting levers, means for moving said independent lever in a direction to apply braking pressure to said brake shoes through said first named rollers and means for moving said independent lever in a direction for releasing said braking pressure.

3. A brake mechanism having in combination a frame, a brake drum, a pair of bell-crank levers pivotally mounted on the lower portion of said frame and carrying brake shoes on their upper arms and having their free lower ends carrying rollers closely spaced beneath said brake drum, means for normally holding said brake shoes in spaced relation to the brake drum, an independent bell-crank lever having a terminal roller element at its free end in operative relation through toggle type action on the rollers on the free ends of said brake shoe supporting levers, and separate means for moving said independent lever in a direction for applying braking pressure on said first named rollers and for releasing said braking pressure.

4. A friction brake, having in combination a frame, a brake drum, a pair of opposite inwardly turned bell-crank levers mounted on said frame, carrying brake shoes on their upstanding arms and having their free ends provided with roller terminal elements closely spaced beneath said brake drum, means for normally holding said brake shoes in spaced relation to the brake drum, an independent bell-crank lever having a roller terminal element at its free end in operative relation through toggle type action on the free ends of said brake shoe supporting levers, and separate means for moving said independent lever in each direction for applying braking pressure on said first named rollers and for releasing said braking pressure.

5. A friction brake having in combination a frame, a brake drum, a pair of bell-crank levers mounted on said frame, carrying brake shoes, having their free ends provided with roller terminal elements closely spaced beneath said brake drum, means for normally holding said brake shoes in spaced relation to the brake drum, an independent spring-pressed bell-crank lever having a roller terminal element at its free end in operative pressure-applying relation through toggle type action on the rollers on the free ends of said brake-shoe supporting levers, and an electro-magnet for holding said independent lever roller out of braking movement against said brake-shoe lever rollers.

6. A friction brake having in combination a frame, a brake drum, a pair of brake shoe supporting elements pivotally mounted on said frame in spaced relation to said drum and having rollers at their free ends in closely spaced relation adjacent said brake drum, an independent spring-pressed lever means carrying a terminal roller and spring-pressed for operative braking engagement, through toggle type action with the rollers on the free ends of said brake shoe supporting elements, and separate means for moving said independent lever to cause the brake shoes to selectively engage and release said brake drum.

7. A friction brake having in combination a frame, a brake drum, a pair of brake shoes, supporting elements for said shoes pivotally mounted on said frame in spaced relation to said drum, spring means for normally holding said brake shoes in spaced relation to said drum and for holding the free ends of said supporting elements in closely spaced relation beneath said drum, rollers on the free ends of said supporting elements, an independent lever mechanism having a terminal member for making operative pressure contact through toggle type action with the rollers on the free ends of said brake-shoe supporting elements, a heavy spring mounted on said lever mechanism and over balancing said first named spring means for normally moving said brake shoes into pressure applying relation to said brake drum, and separate means for retracting said spring to release the pressure on said brake drum.

8. A friction brake having in combination a frame, a brake drum, a pair of brake shoes, supporting elements for said shoes pivotally mounted on said frame and having on their free ends rollers in closely spaced brake shoe releasing relation adjacent said brake drum, independent lever means having a terminal roller for operative engagement through toggle type action with the rollers on the free ends of said brake shoe supporting elements, and means, including a retracting spring, for moving said independent lever to cause said brake shoes to selectively engage and release said brake drum, and electro-magnetic means for overcoming said brake applying means and whereby said brake shoe supporting elements are free to move to brake-releasing position.

9. A friction brake having in combination a frame, a brake drum, a pair of brake shoes, supporting elements for said shoes pivotally mounted on said frame in spaced relation to said drum, spring means for normally holding said brake shoes in spaced relation to said drum and for holding the free ends of said supporting elements in closely spaced relation beneath said drum, an independent lever mechanism having a terminal member for making operative pressure contact, through toggle type action, with the free ends of said brake-shoe supporting elements, a heavy spring mounted on said lever mechanism and over-balancing said first named spring means for normally moving said brake shoes into pressure applying relation to said brake drum, and electro-magnetic means to release the pressure of the operative contact member of said brake drum, whereby said brake-shoe supporting elements are free to move to brake-releasing position.

10. A friction brake having in combination a frame, a brake drum, a pair of brake shoes, supporting elements for said shoes pivotally mounted on said frame in spaced relation to said drum, spring means for normally holding said brake shoes in spaced relation to said drum and for holding the free ends of said supporting elements in closely spaced relation beneath said drum, rollers on the free ends of said supporting elements, an independent lever mechanism having a terminal member for making operative pressure contact, through toggle type action, with the rollers on the free ends of said brake shoe supporting elements, a heavy spring mounted on said lever mechanism for normally moving said brake shoes into pressure-applying relation to said brake drum, and electro-magnetic means for allowing said brake shoes to be retracted from said drum.

11. A braking mechanism comprising a frame, a brake drum and three levers each independently pivotally mounted on said frame with their lower ends carrying rollers in closely spaced relation beneath said brake drum, a pair of brake-shoes supported on two of said levers at their free ends on opposite sides of said brake drum, and means for moving said third independent lever to carry the roller thereon into and out of operative pressure contact with the rollers on the ends of said brake-shoe supporting levers for moving said brake-shoes into and out of operative engagement with said drum.

12. In a brake mechanism, a frame, a brake drum, an operative mechanism comprising three bell-crank levers free of linkage connection with each other, two of said bell-crank levers supporting brake shoes on their upright portions on opposite sides of said brake drum with their lower ends directed toward each other and having terminal rollers in closely spaced relation beneath said brake drum, the remaining bell-crank lever being positioned with its upright portion behind one of the said brake shoe supporting levers and its lower portion carrying a terminal roller above said terminal rollers on the brake shoe supporting levers, the operation of said remaining bell-crank lever being arranged to move the terminal roller thereon into and out of pressure contact with the rollers on said brake shoe supporting levers, and means for operating said remaining bell-crank lever to move the brake shoes toward and away from said brake drum.

13. An apparatus of the character described having in combination a brake drum, a support positioned adjacent the lower portion of said brake drum, at least one member pivotally mounted on said support and having a braking element normally spaced from said drum for movement to bear frictionally against said brake drum, a roller mounted at the free end of said member, a lever mounted on a support adjacent said drum carrying a pressure roller positioned adjacent said first-named roller and offset slightly from the path of movement of said first-named roller, means for moving said lever to apply pressure through said respective rollers to cause braking action on said brake drum, and means for holding said rollers out of braking relation.

14. An apparatus of the character described having in combination a brake drum, a support adjacent said brake drum, a pivoted lever carrying a brake shoe mounted on said support, a roller at the free end of said lever, spring means for normally holding said brake shoe in spaced relation to said drum, a lever mechanism for moving said first-named lever into braking position, a pressure roller carried on the free end of said lever mechanism for movement into slightly offset operative contact with said first-named roller, spring means for actuating said lever mechanism, and means for holding said spring means in inoperative position.

15. A brake mechanism comprising a frame, a brake drum mounted on said frame, a lever fulcrumed on said frame, a brake shoe pivotally supported on one end of said lever for movement thereby into engagement with and disengagement from said drum, a roller mounted on the opposite end of said lever, spring means for biasing said lever in a direction to hold said shoe in disengaged relation to said drum, an independent lever fulcrumed on said frame on an axis parallel to the axis on which said first mentioned lever is fulcrumed and provided at one end with a contact member, that end portion of said independent lever on which said contact member is mounted extending into overlapping relation with the roller carrying end portion of said first mentioned lever to position said contact member in operative spaced relation to said roller, and separate means for respectively moving the opposite end portion of said independent lever in a direction to move said contact member into engagement with said roller to operate said first mentioned lever in a direction to engage said brake shoe with said drum and in a direction to permit the brake shoe to be withdrawn from said drum.

RICHARD L. BROWNING.

REFERENCES CITED

The following references are of record in the file of this patent:

UNITED STATES PATENTS

| Number | Name | Date |
|---|---|---|
| 461,052 | Shaw | Oct. 13, 1891 |
| 979,720 | Sundh | Dec. 27, 1910 |
| 1,102,523 | Lindquist et al. | July 7, 1914 |
| 1,178,115 | Wheeler | Apr. 4, 1916 |
| 1,199,869 | Burton | Oct. 3, 1916 |
| 1,364,072 | Burton | Jan. 4, 1921 |
| 1,672,314 | Hall | June 5, 1928 |
| 1,636,648 | Baselt | Oct. 9, 1928 |
| 1,901,662 | Mahoney | Mar. 14, 1933 |
| 1,936,865 | Taylor | Nov. 28, 1933 |
| 1,993,612 | Lum | Mar. 5, 1935 |

FOREIGN PATENTS

| Number | Country | Date |
|---|---|---|
| 423,235 | Great Britain | not accepted |
| 502,871 | Great Britain | Mar. 24, 1939 |
| 503,776 | Great Britain | Apr. 11, 1939 |